Aug. 14, 1962     P. R. BARLOW     3,048,972
ROCKET MOTOR CONSTRUCTION
Filed Dec. 31, 1958
Fig. 1
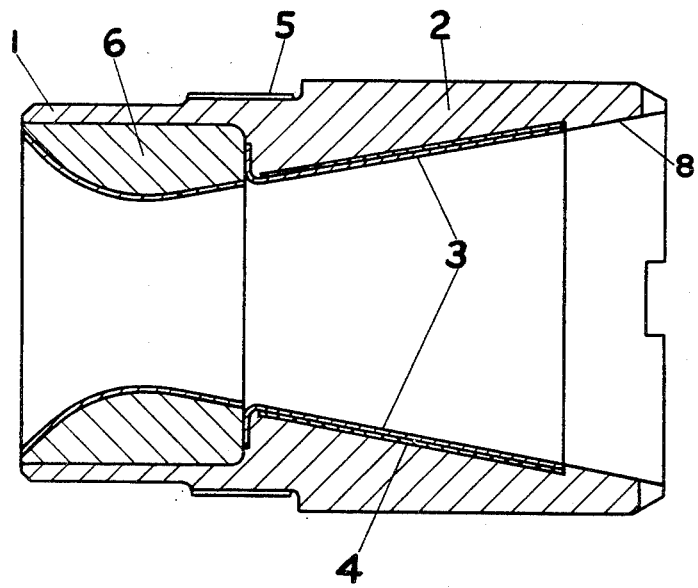
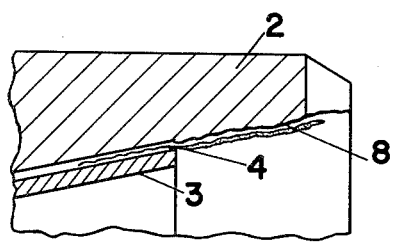
Fig. 2
INVENTOR
PEERS RONALD BARLOW
BY Cushman, Darby & Cushman
ATTORNEYS

United States Patent Office 3,048,972
Patented Aug. 14, 1962

3,048,972
ROCKET MOTOR CONSTRUCTION
Peers Ronald Barlow, Kidderminster, England, assignor to Imperial Chemical Industries Limited, London, England, a corporation of Great Britain
Filed Dec. 31, 1958, Ser. No. 784,392
Claims priority, application Great Britain Jan. 7, 1958
5 Claims. (Cl. 60—35.6)

This invention relates to rocket motor construction and is particularly concerned with improvements in the expansion cone portion of the rocket motor nozzle.

The nozzle of a rocket motor comprises a choke portion and an expansion cone portion and various attempts have been made in the past to protect the surfaces of these parts against the severe erosive action of hot gases flowing therethrough. The object of this invention is to provide an expansion cone for a rocket motor nozzle possessing improved resistance to this erosive action.

The present invention comprises a rocket motor nozzle expansion cone of thermal resistant synthetic resinous material susceptible to erosion by hot gases and a protective liner of a metal having a high melting point, preferably at least about 2500° C.

The liner may be conveniently formed, for example, as a spinning of molybdenum, tantalum or tungsten.

The cone is conveniently formed of a reinforced thermosetting resin, e.g. one of the asbestos-reinforced phenolic resins available commercially under the names of Durestos, Mintex, and Tufnol. Glass fibre reinforced resins may also be used.

While the expansion cone described above is very satisfactory from the point of view of erosion resistance, it is found that the resinous materials used for the cone body generate volatile materials under the effect of the hot gases and this gives rise to a slight amount of buckling of the metal liner. The result of this buckling is that the resultant thrust from the cone is slightly misaligned.

To overcome the possibility of buckling, therefore, it is preferred to interpose between the metal liner and the cone body an intermediate layer capable of providing a leakage path for the volatile materials produced in operation. This intermediate layer, according to the invention, is composed of thermoplastic material which becomes molten in operation to allow the ducting of the gases away to the exhaust end of the cone where they escape with the main gas stream. Thermoplastic material such as polyethylene or nylon may be used for the intermediate layer, in the form of sheeting, say 1/16 inch in thickness.

FIGURE 1 is a longitudinal section view of the nozzle constructed according to this invention;

FIGURE 2 is an enlarged section view of the rearward portion of the nozzle in FIGURE 1, as the exhaust gases are escaping therefrom.

One embodiment of the invention will now be described with reference to the accompanying drawing which shows, in section, a nozzle constructed in the asbestos-reinforced phenolic resin known as Durestos.

The nozzle comprises a choke housing 1, and an integral cone portion 2 which is conical on its internal surface. Mounted on the internal surface is a protective liner 3 constituted by a molybdenum spinning 40 thousandths of an inch in thickness and interposed between the liner 3 and cone body 2 is an intermediate layer 4 of polyethylene (or nylon) sheeting 1/16 inch thick.

To assemble the structure shown, the molybdenum spinning is supported on an internal mandrel and the polyethylene (or nylon) sheeting is wrapped around its outer surface. Durestos felts are then packed around the outside of the system and the system is cured under heat and pressure in a mould shaped to produce the choke and cone portions, as illustrated, to an outer diameter of about 4¾ inches.

The outer surface of the cooled nozzle is then threaded at 5 to permit of the nozzle being mounted in a blast pipe or the rear end closure of the rocket motor.

Mounted in the choke housing 1 is a high grade carbon choke 6 coated with alumina for the purpose of protection against the hot gases.

As the temperature of the liner 3 is elevated by the hot escaping gases, this heat is transferred to the intermediate layer 4; also, these escaping gases tend to erode the rearward portion 8 of the cone portion 2. As this intermediate layer 4 becomes molten, this molten material flows rearwardly out of the space occupied thereby due to the forward momentum of the nozzle. This escaping molten material 4 thus leaves the portion at the rearward end 8 due to the leakage path provided, as best shown in FIGURE 2.

From the foregoing description of the various embodiments of this invention, it is evident that the objects of this invention, together with many practical advantages are successfully achieved. While preferred embodiments of my invention have been described, numerous further modifications may be made without departing from the scope of this invention.

Therefore, it is to be understood that all matters herein set forth or shown in the accompanying drawings are to be interpreted in an illustrative and not in a limiting sense.

I claim:
1. A rocket motor nozzle expansion cone of thermal resistant synthetic resinous material susceptible to erosion by hot gases, a protective internal metal liner for said nozzle, said liner having a melting point of at least 2500° C., and an intermediate layer between said liner and said cone, said layer being of a thermoplastic material which becomes molten during operation of the rocket motor, and the construction of said expansion cone being such that after said thermoplastic layer becomes molten said thermoplastic layer can escape rearwardly therefrom along the wall of said nozzle, thereby providing a leakage path for volatile materials in the synthetic resin whereby deformation of said liner is substantially prevented.

2. An expansion cone according to claim 1 wherein said thermoplastic layer at its rear end abuts against the material of said expansion cone and escapes after erosion of said expansion cone by the exhaust gases of the rocket motor.

3. An expansion cone according to claim 1, in which the thermoplastic material is nylon in sheet form.

4. An expansion cone according to claim 1, in which the thermoplastic material is polyethylene in sheet form.

5. A method of constructing a rocket motor nozzle expansion cone comprising supporting on a mandrel a generally frustoconical liner of a high-melting point metal selected from the group consisting of molybdenum, tantalum and tungsten, said liner having a form which corresponds to the expansion cone portion of the nozzle, disposing on the outer surface of said liner a layer of thermoplastic material selected from the group consisting of nylon and polyethylene, and moulding thermal resistant synthetic resinous material over said thermoplastic material in the form of said expansion cone and in such manner as to secure said liner to said cone.

References Cited in the file of this patent

UNITED STATES PATENTS 2,835,107     Ward _____ May 20, 1958

FOREIGN PATENTS 622,217     Great Britain _____ Apr. 28, 1949
691,953     Great Britain _____ May 27, 1953
757,890     Great Britain _____ Sept. 26, 1956